US010915683B2

(12) United States Patent
Surisetty et al.

(10) Patent No.: US 10,915,683 B2
(45) Date of Patent: Feb. 9, 2021

(54) METHODOLOGY TO CREATE CONSTRAINTS AND LEVERAGE FORMAL COVERAGE ANALYZER TO ACHIEVE FASTER CODE COVERAGE CLOSURE FOR AN ELECTRONIC STRUCTURE

(71) Applicant: Synopsys, Inc., Mountain View, CA (US)

(72) Inventors: Vinay Kumar Surisetty, Bangalore (IN); Nivin Ninan George, Bangalore (IN); Hari Pramoda Sri Sesha Arun Vedantham, Bangalore (IN); Chaitanya Kamasani, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 147 days.

(21) Appl. No.: 16/297,554

(22) Filed: Mar. 8, 2019

(65) Prior Publication Data

US 2019/0278884 A1 Sep. 12, 2019

(30) Foreign Application Priority Data

Mar. 8, 2018 (IN) .............................. 201811008488

(51) Int. Cl.
*G06F 30/30* (2020.01)
*G06F 8/41* (2018.01)
(Continued)

(52) U.S. Cl.
CPC ............ *G06F 30/30* (2020.01); *G06F 8/4435* (2013.01); *G06F 30/3323* (2020.01); *G06F 2117/08* (2020.01)

(58) Field of Classification Search
CPC .... G06F 30/30; G06F 30/3323; G06F 8/4435; G06F 2117/08; G06F 2111/04
See application file for complete search history.

(56) References Cited

U.S. PATENT DOCUMENTS 6,363,520 B1 * 3/2002 Boubezari ...... G01R 31/318364
716/103
7,020,856 B2 * 3/2006 Singhal ............... G06F 30/3323
716/106
(Continued)

FOREIGN PATENT DOCUMENTS

CN 108388504 A 8/2018

OTHER PUBLICATIONS

Delp, Dr. Gary, LSI—A review of the IEEE P1801: Standard for the Design and Verification of Low Power Integrated Circuits DesignCon 2009 Low Power Workshop, Feb. 2009, 64 pages.
(Continued)

*Primary Examiner* — Nha T Nguyen
(74) *Attorney, Agent, or Firm* — Bever, Hoffman & Harms, LLP

(57) ABSTRACT

An efficient unreachability analysis tool utilizes toggle coverage report data to automatically generate constraints associated with viable constant signals (e.g., constant inputs, one-time programmable and constant registers) utilized in a circuit design before performing a full unreachability analysis process, thereby improving the functioning of the computer/processor executing the unreachability analysis process by identifying low-activity registers and constraining them before the unreachability analysis process is performed, thereby substantially reducing the number of process steps required to identify dead code (unreachable signal/register targets). Constant inputs are identified using the toggle coverage report and used to generate corresponding constraints, and an initial unreachability analysis process is performed using only toggle coverage properties, then the full unreachability analysis process is performed for all (i.e., line, conditional, state/FSM and toggle) coverage properties using the constant input constraints. Constraints are also generated for one-time programmable and constant registers
(Continued)

(OTP/C) before performing the full unreachability analysis process.

12 Claims, 5 Drawing Sheets

(51) Int. Cl.
*G06F 30/3323* (2020.01)
*G06F 117/08* (2020.01)

(56) References Cited

U.S. PATENT DOCUMENTS

| | | | | |
|---|---|---|---|---|
| 7,322,017 | B2 * | 1/2008 | Baumgartner | G06F 30/3323 716/104 |
| 7,861,226 | B1 | 12/2010 | Episkopos et al. | |
| 7,926,020 | B1 | 4/2011 | Lu et al. | |
| 7,970,594 | B2 * | 6/2011 | Gaudette | G06F 30/33 703/13 |
| 8,181,146 | B1 * | 5/2012 | Low | G06F 30/3323 716/136 |
| 8,326,778 | B1 | 12/2012 | Lu et al. | |
| 8,418,119 | B2 * | 4/2013 | Case | G06F 30/327 716/132 |
| 8,443,316 | B1 * | 5/2013 | Biswas | G06F 30/33 716/106 |
| 8,826,202 | B1 * | 9/2014 | Goel | G06F 11/263 716/106 |
| 8,839,203 | B2 | 9/2014 | Opstad et al. | |
| 9,020,797 | B2 | 4/2015 | Lin et al. | |
| 9,158,874 | B1 * | 10/2015 | Ranjan | G06F 30/33 |
| 9,373,077 | B1 * | 6/2016 | Cohen | G06F 30/33 |
| 9,378,000 | B1 * | 6/2016 | Lee | G06F 8/443 |
| 9,626,468 | B2 * | 4/2017 | Cerny | G06F 30/3323 |
| 9,679,097 | B2 | 6/2017 | Srivastava | |
| 10,083,262 | B2 * | 9/2018 | Darbari | G06F 30/30 |
| 2003/0208730 | A1 * | 11/2003 | Singhal | G06F 30/3323 716/106 |
| 2004/0230927 | A1 * | 11/2004 | Chen | G06F 30/3323 716/106 |
| 2006/0129958 | A1 * | 6/2006 | Raymond | G06F 30/3323 716/104 |
| 2009/0037858 | A1 * | 2/2009 | Thakur | G01R 31/31835 716/106 |
| 2009/0037859 | A1 * | 2/2009 | Thakur | G06F 30/33 716/106 |
| 2009/0144683 | A1 * | 6/2009 | Lehavot | G06F 30/398 716/113 |
| 2010/0042965 | A1 * | 2/2010 | Baumgartner | G06F 30/327 716/104 |
| 2010/0199244 | A1 * | 8/2010 | Kwok | G06F 30/3323 716/113 |
| 2010/0269078 | A1 * | 10/2010 | Dsouza | G06F 30/3323 716/106 |
| 2011/0071809 | A1 * | 3/2011 | Keidar-Barner | G06F 30/3323 703/6 |
| 2012/0198397 | A1 * | 8/2012 | Moon | G06F 30/3323 716/102 |
| 2013/0019216 | A1 * | 1/2013 | Vasudevan | G06F 30/3323 716/106 |
| 2013/0103983 | A1 * | 4/2013 | Tzoref-Brill | G06F 11/3676 714/26 |
| 2015/0154096 | A1 * | 6/2015 | Sakallah | G06F 30/3323 703/2 |
| 2019/0094300 | A1 * | 3/2019 | Greiner | G06F 30/33 |

OTHER PUBLICATIONS

Biggs, John et al., IEEE Standards Association "Low-poer Design with the New IEEE 1801-2013 Standard" Workshop #4: presented by members of the IEE P1801 WF, Jun. 2, 2013.
Cadence Design Systems, Inc., "Verify Power Domain", 2015, 2 pages.
Keng, Brian et al., article entitled "Automated Debugging of Missing Input Constraints in a Formal Verification Environment", published in 2012 Formal Methods in Computer-Aided Design (FMCAD), added to IEEE Xplore Feb. 19, 2013, 6 pages.

* cited by examiner

METHODOLOGY TO CREATE CONSTRAINTS AND LEVERAGE FORMAL COVERAGE ANALYZER TO ACHIEVE FASTER CODE COVERAGE CLOSURE FOR AN ELECTRONIC STRUCTURE

RELATED APPLICATION

This application claims priority from Indian Provisional patent application serial number IN201811008488 entitled "A METHODOLOGY TO CREATE CONSTRAINTS AND LEVERAGE FORMAL COVERAGE ANALYZER TO ACHIEVE FASTER CODE COVERAGE CLOSURE FOR AN ELECTRONIC STRUCTURE", which was filed on Mar. 8, 2018, and is incorporated by reference herein.

BACKGROUND DISCLAIMER

In the following Background, Summary, and Detailed Description, headings should not be construed as necessarily limiting. In the following Background, Summary an Detailed Description, citation or identification of any publication does not signify relevance or status as prior art for any of the claimed or described embodiments. Paragraphs for which the text is all italicized signifies text that is common to multiple Synopsys patent specifications.

FIELD OF THE INVENTION

This disclosure relates to the field of electronic design automation in general, including the following topics: Formal methods for logic simulation (G06F 17/504).

BACKGROUND

Code Coverage (aka unreachability analysis or UNR) is a very time-consuming task often taken up by both design and verification engineers of a digital system of any complexity. The job involves engineers collecting coverage databases from simulations, generating coverage reports and analyzing the design for any uncovered items. Synopsys Incorporated of Mountain View Calif. USA provides a formal verification tool (i.e., VC Formal) that includes an unreachability analysis toolstep (i.e., VC Formal Coverage Analyzer, or VC FCA) that addresses the effort involved in pruning out all the unreachable targets in a circuit design. An unreachable target is either a line, condition, or an FSM transition, which can never be exercised by any stimulus whatsoever. These unreachable targets are identified and marked as unreachable in the respective coverage reports. The VC FCA unreachability analysis toolstep processes the VCS simulation coverage database generated for a particular circuit design, extracts the unreachable targets, and then performs an unreachability analysis on the extracted unreachable targets and generates an exclusion file. The simulation coverage database and the formally generated exclusion file can be loaded into a coverage viewer tool, such as URG or Verdi Coverage, which are also provided by Synopsys Incorporated, to verify improvement in the coverage score.

A problem with currently available unreachability analysis toolsteps is that the unreachability analysis requires a substantial amount of processing time to setup and complete each UNR process. That is, unreachability analysis toolsteps rely on toggle count data (e.g., as provided in Toggle Coverage Reports generated by the VC FCA toolstep) to identify unreachable targets by way of low and zero switching activity. This approach to identifying unreachable target increases processing time because a large number of viable targets (e.g., constant input signals and one-time programmable registers) are identified as possible unreachable targets. Because a significant amount of processing must be performed for each possible unreachable targets, the additional time required to analyze these valid signals greatly increases the time required to perform unreachability analysis. That is, although conventional unreachability analysis toolsteps are ultimately able to distinguish valid signals from unreachable targets, the amount of time required to perform the analysis is unnecessarily long.

What is needed is an unreachability analysis and toolstep that addresses the problems set forth above.

SUMMARY

The present invention is directed to a method for enhancing the efficiency of unreachability analysis tools by way of utilizing information available in toggle coverage reports to automatically generate constraints associated with viable constant signals utilized in a circuit design before performing the unreachability analysis process, thereby improving the functioning of the computer/processor executing the unreachability analysis process by substantially reducing the number of process steps required to identify dead code (unreachable signal/register targets). That is, the process of automatically generating the constant signal constraints using only the toggle coverage reports and then performing an unreachability analysis process using the constant signal constraints requires substantially less processing cycles than that required to perform the same unreachability analysis process without the constant signal constraints.

In a first specific embodiment of the present invention, the toggle coverage reports are utilized to identify constant input signals and to generate corresponding constant input constraints, which are then stored in a UNR constraint file. A partial (first) unreachability analysis process is performed using only toggle coverage properties and the stored constant input constraints to distinguish viable signals/registers from dead code, and then a full (second) unreachability analysis process is performed for all coverage properties (i.e., line coverage properties, conditional coverage properties, state/FSM coverage properties, and toggle coverage properties) using the constant input constraints (along with any other previously generated constraints). In a preferred embodiment, the constant inputs are forward propagated through synchronizers (i.e., blocks that transfer data from one clock/power domain to another clock/power domain) to extend the constant input constraints to all signals/registers in all clock/power domains. The total processing time required to identify the constant input signals, to generate corresponding constant input constraints, to perform the partial (first) unreachability analysis process, and then to perform the full (second) unreachability analysis process using the constant input constraints is substantially less than the total processing time required to perform the full (second) unreachability analysis process without the constant input constraints.

In a second specific embodiment of the present invention, the toggle coverage reports are utilized to identify one-time programmable and constant registers (OTP/C) and to generate corresponding OTP/C constraints, and then the full unreachability analysis process is performed for all coverage properties using the OTP/C constraints. The total processing time required to identify the one-time programmable and constant registers, to generate corresponding OTP/C constraints, to perform the full (second) unreachability analysis process using the OTP/C constraints is substantially less than the total processing time required to perform the full (second) unreachability analysis process without the OTP/C constraints.

In a presently preferred embodiment, both the first and second embodiments are combined to maximize efficiency of the unreachability analysis process.

BRIEF DESCRIPTION OF THE DRAWINGS

The following Detailed Description, Figures, appended Additional Figures and appended Claims signify the nature and advantages of the innovations, embodiments and/or examples of the claimed inventions. The Figures signify innovations, embodiments, and/or examples of the claimed inventions for purposes of illustration only and do not limit the scope of the claimed inventions. The Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Figure 1:
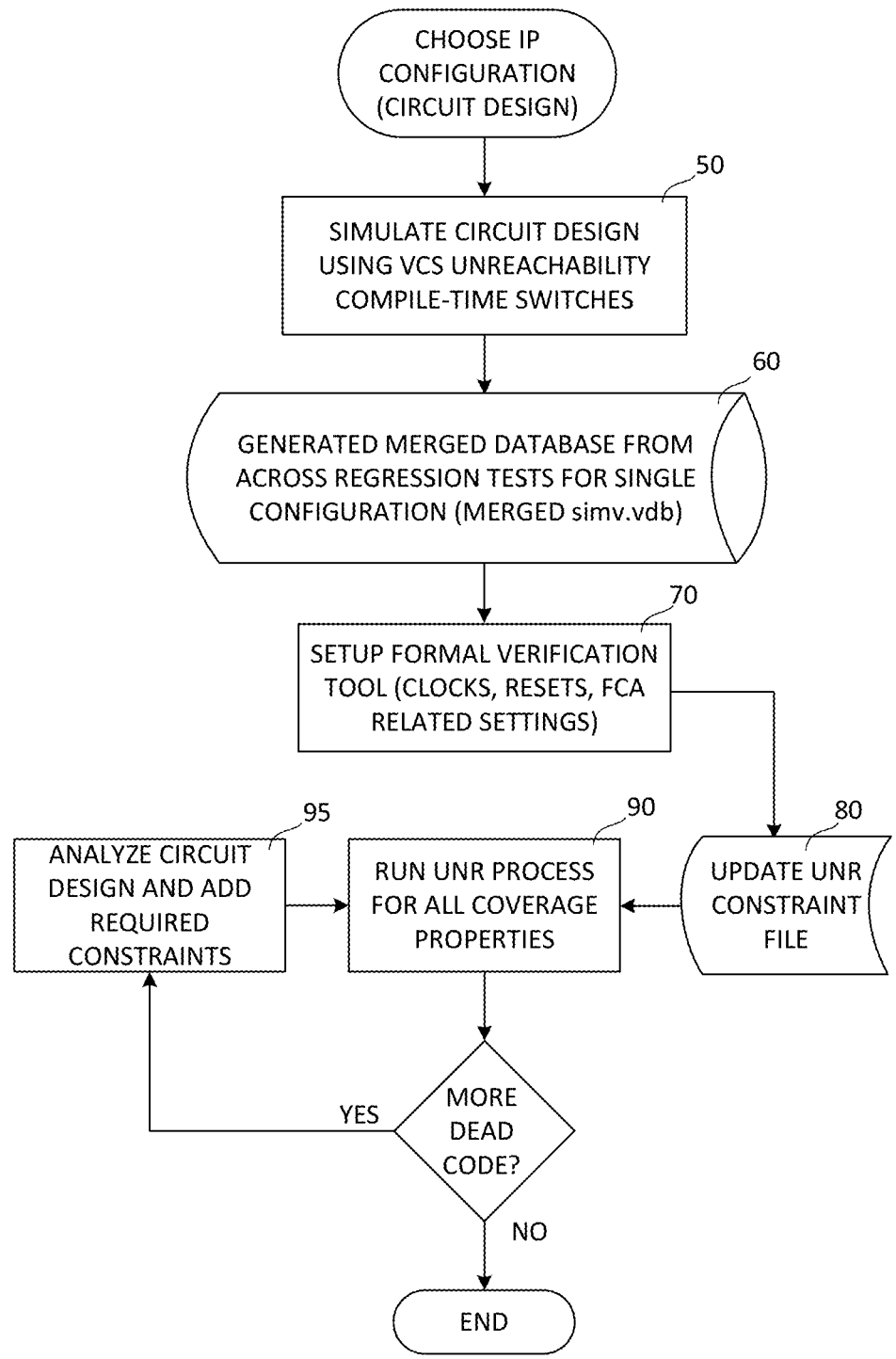
Figure 2A:
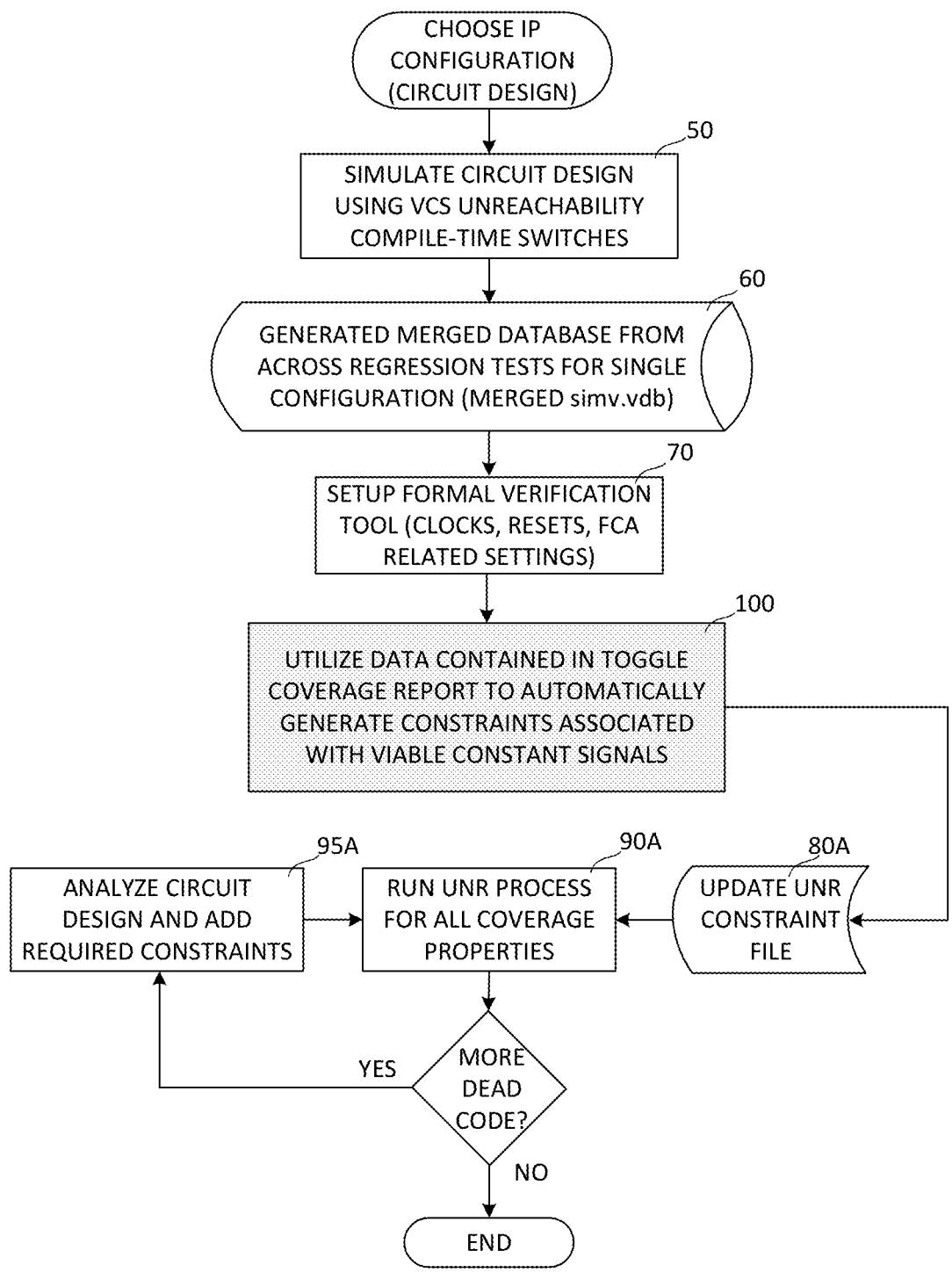
Figure 2B:
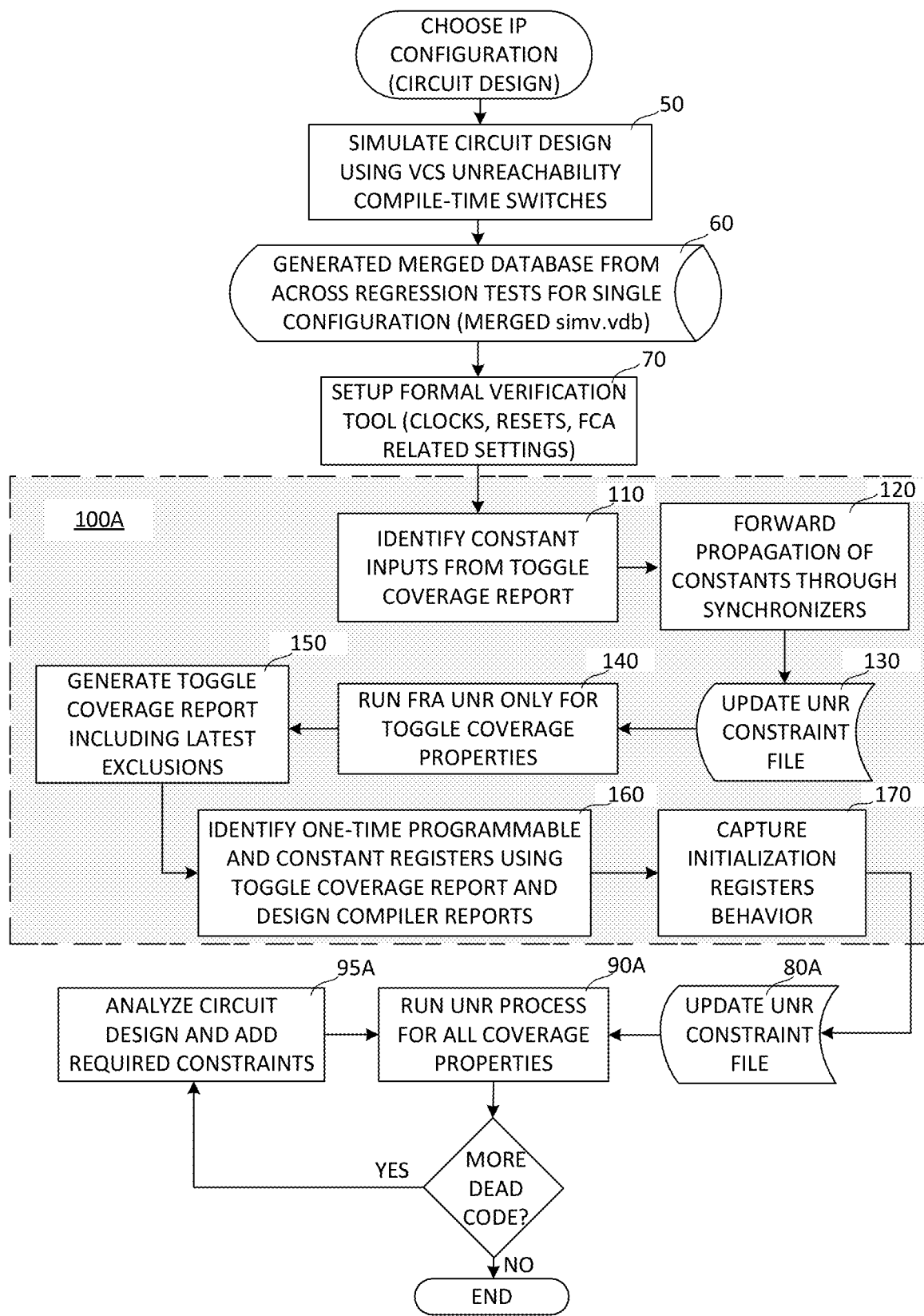
Figure 3B:
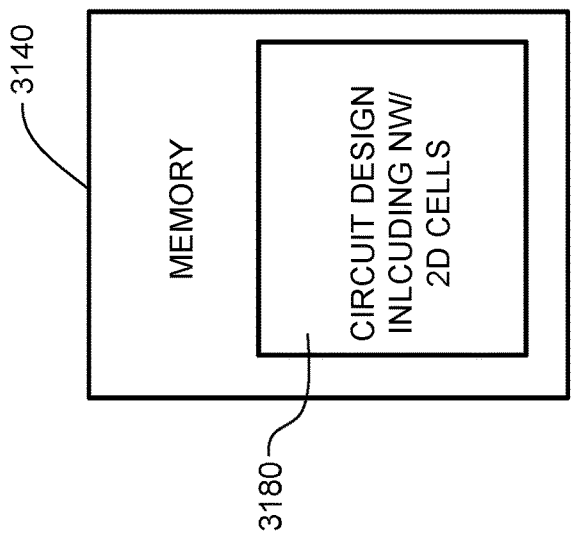
Figure 3C:
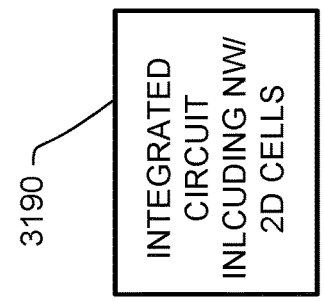
Figure 3A:
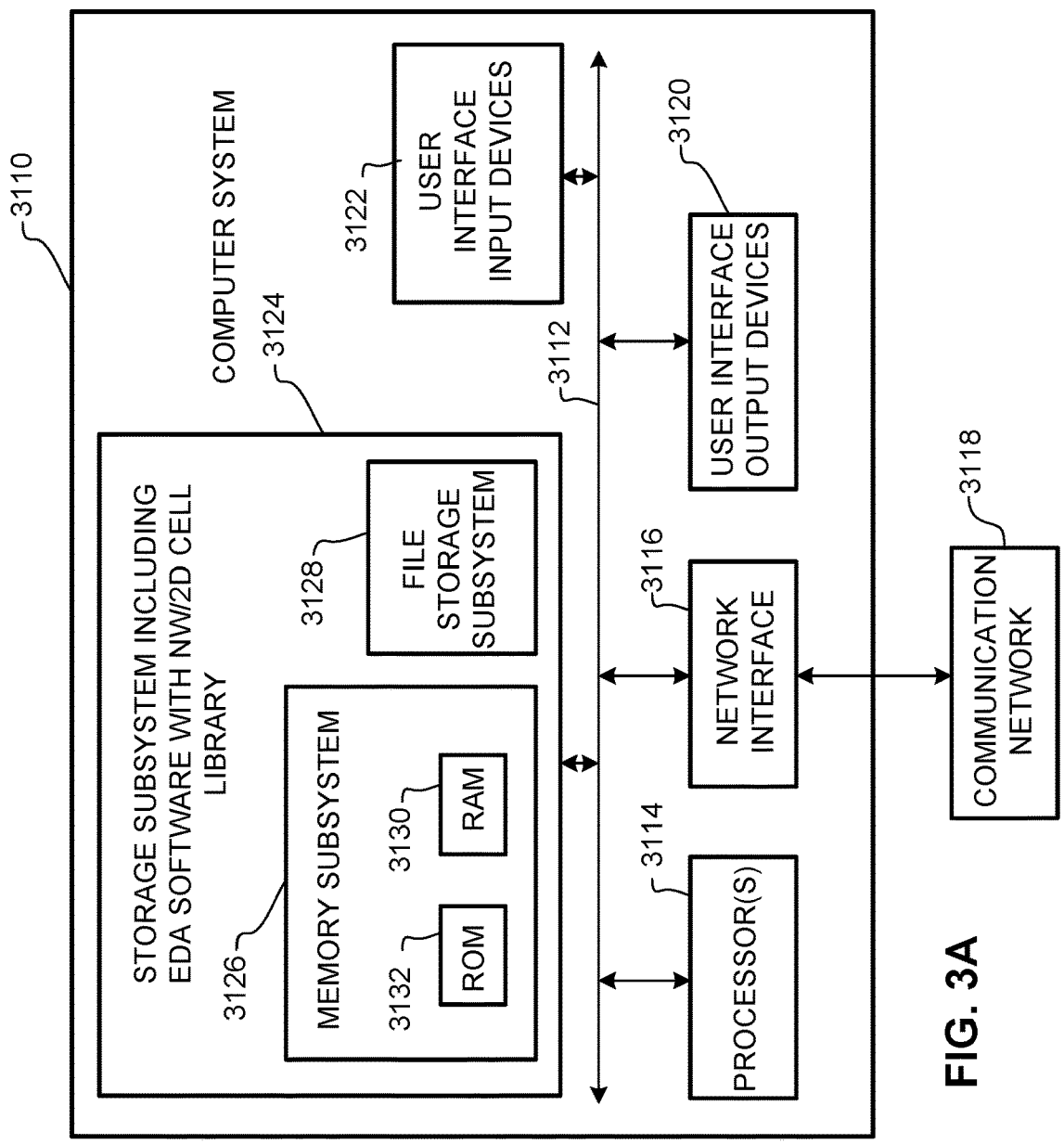
Figure 4:
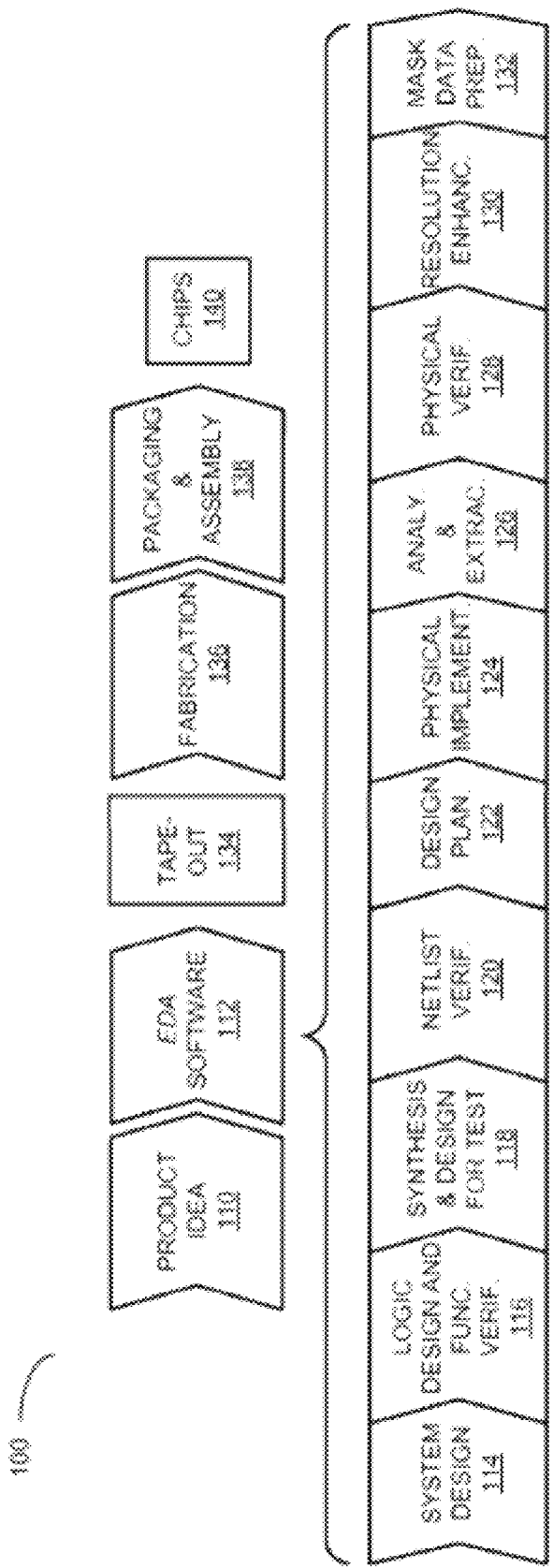

These and other features, aspects and advantages of the present invention will become better understood with reference to the following description, appended claims, and accompanying drawings, where:

FIG. 1 is a flow diagram showing a basic flow using VC Formal FCA for unreachability (UNR) analysis;

FIG. 2A is a flow diagram showing a modified flow for unreachability (UNR) analysis according to a generalized embodiment of the present invention;

FIG. 2B is a flow diagram showing a modified flow for unreachability (UNR) analysis according to a specific embodiment of the present invention;

FIGS. 3A, 3B and 3C are simplified block diagrams of a computer system suitable for use with embodiments of the present invention, as well as circuit design and circuit embodiments of the technology associated with the present invention; and FIG. 4 is a flowchart illustrating various operations in the design and fabrication of an integrated circuit in accordance with an embodiment of the present disclosure.

DETAILED DESCRIPTION

The present invention is described with reference to specific functions performed by the VC Formal tool provided by Synopsys Incorporated. References to the specific VC Formal functions. Those skilled in the art will understand that the specific VC Formal functions referenced herein are implemented in other Formal Verification tools using other functional names. The appended claims are not intended to be limited to the specific VC Formal functions reference herein.

The optimal flow for setting up the formal verification environment with the initial required set of constraints which are derived automatically from coverage reports, RTL code and Register Map of the design. Reports from different tools like Synopsys' Design compiler and VCS are utilized at different points in the flow. There are multiple variants provided at certain steps in the flow, which can be chosen based on the complexity of the design under test. This invention in its full potential makes the process of setting up formal verification environment for coverage analysis faster and easier, and the unreachability analysis, in general, more productive, so the user can identify the actual uncovered items faster. This invention is intended as an optimal flow for using Synopsys' VC Formal Coverage Analyzer tool, aiding it in extracting the unreachable coverage items (dead code) in a circuit design in less time than if the invention was not used. In one embodiment, the invention may be described as a more efficient electronic structure/method comprising a methodology to create constraints and leverage a formal coverage analyzer to achieve faster code coverage closure.

The present invention implements several methodologies that may be utilized to automatically create an initial set of constraints required for modelling the basic functionality of a circuit design during an unreachability analysis process. 1: Identifying constant inputs from Toggle Coverage Report: A methodology is described to extract the input ports of the design, which are tied to some constant value. These signals can be analyzed for their behavior and are converted into constraints and provided to the tool. 2: Identifying one time programmable and constant registers using Toggle Coverage and Design Compiler Reports: a methodology to identify one-time programmable registers or constant value registers in the design. These signals can be analyzed for their behavior and are converted into constraints and provided to the tool. A custom script is used to automatically create required constraints on selected set of signals and provided as constraints to the tool. It provides multiple options for identifying these registers, the user can select the method which suits their design: 2A: A spread sheet containing the list of flops (or register bits) in the design which never toggled, using Toggle Coverage Report. The user can review only these signals and write constraints on them. 2B: If the number of flops produced by feature described in 2A is very large, one more step is described, which filters that list, retaining only the flops which are associated with the programming interface of the design (AHB/APB/AXI/other system bus). Synopsys' Spyglass or VC Formal fan in detection features are used for this step. 2C: A Register to RTL signal mapping technique is described to help the user in writing the constraints at the programming interface level rather than on the RTL signals involved. 3: Forward propagation of constants through synchronizers: A simple automated methodology that creates certain constraints by using the VCS constant file. This methodology is recommended to be used with a certain feature in VC Formal (or corresponding feature in another Formal Verification tool), which makes the analysis more productive reducing the formal effort required by the tool. 4: Capturing Initialization registers behavior as constraints: A simple methodology of writing constraints to model the initialization behavior present in most of the design by writing constraints using FSMs and register signals present in the circuit design. 5: Back Annotation of constraints into Coverage Reports: A script based methodology for exporting the annotations for excluded items during the UNR process. Formal Verification tools (e.g., VC Formal) have the capability to find out which constraints are responsible for a particular coverage item getting excluded. This information is exported to coverage reports using a custom script. 6: Validation of properties during simulation: a simple methodology to maintain the constraints which are accumulated into the UNR constraint file, such that they can be validated and any wrong constraints can be corrected. Easy maintenance and Reuse: The key benefit of the present invention lies in maintaining the constraints or properties for reuse across different configurations of the design or when the design is instantiated in any system. The properties can be exported as coverage assertion IPs across different systems.

FIG. 1 depicts the basic flow using VC Formal FCA for UNR analysis (or another unreachability analysis tool) to identify dead code (unreachable signals or registers) in a circuit design. A circuit design is submitted for simulation (block 50), preferably using VCS unreachability compile-time switches (or similar functional switches provided in other Formal Verification tools). A merged database is then generated using all previously performed simulations (block 60). Once the coverage database is generated, basic Formal Verification tool setup is performed by providing Clocks and Resets and any tool-specific settings (block 70), and any constraints available at that time are utilized to update a UNR constraint file (block 80). Thereafter, an iterative process is performed including performing the UNR process (block 90), analyzing uncovered items (i.e., dead code; block 95), and adding constraints to the UNR constraint file for items which cannot be covered. Note that Formal Verification tools work based on constraints because there is no test bench to drive the stimuli. In order to achieve meaningful results from the Formal Verification tool, proper design related constraints should be provided on the inputs and control registers which are meant to be programmed by the software. The number of iterations involved in this basic flow may not be manageable because of the manual effort required during the iterative process.

FIG. 2A depicts a modified method for enhancing the efficiency of unreachability analysis tools by way of utilizing information available in toggle coverage reports to automatically generate constraints associated with viable constant signals utilized in a circuit design (block 100) before performing the full unreachability analysis process (block 90A), thereby improving the functioning of the computer/processor executing the full unreachability analysis process by substantially reducing the number of process steps required to identify dead code (unreachable signal/register targets). That is, the number of processing steps required to automatically generating the constant signal constraints using only the toggle coverage reports (block 100A) and then performing the full unreachability analysis process (block 90A) using the constant signal constraints requires substantially less processing cycles than that required to perform the same unreachability analysis process without the constant signal constraints (i.e., as performed by block 90 in FIG. 1).

FIG. 2B depicts a modified method for enhancing the efficiency of unreachability analysis tools in which the automatic generation of constraints (block 100A, corresponding to block 100 of FIG. 2A) is described with reference to a presently preferred embodiment of the present invention. The main idea behind this flow is to get rid of all the trivial or uncoverable coverage items very early in the analysis process and to allow the user to identify the valid uncovered items faster. This goal is achieved by way of performing one or more of the processes described below with reference to blocks 110 to 170.

Blocks 50 to 70: These processes are performed substantially as described above. Once the coverage database is ready, a Toggle Coverage Report of the circuit design is generated, for example, using the URG (Unified Report Generator) tool provided in VC Formal. The Toggle Coverage Report has the information on each signal in the design if it has toggled from 0→1, 1→0 and both. VCS compile time switch "-cm_tgl portsonly" can be used to restrict the Report to only ports.

Block 110: Identifying constant inputs from Toggle Coverage Report: A custom script is used to collect all the Toggle Coverage information of all the input ports of the design in a spread sheet using techniques know in the art. The phrase "constant inputs" refers to some of the inputs to the circuit design that may be tied to constant values or some signals inside the design which are assigned constant values. A designer can analyze the behavior of these signals and if any of the signals are expected to be tied to constant values, they can be exported to VC Formal in the form of constraints. These constraints can be in the format required by the tool or could be in the form of System Verilog Assertion (SVA) properties, constraints or SVA properties are used interchangeably in this document.

Block 120: Forward propagation of constants through synchronizers: This step involves automatically propagating the constant input constraints from the input source to the output of synchronizers, which is useful if the circuit design uses any custom synchronizer cells for handling Clock Domain Crossing (CDC) paths. A synchronizer (or synchronizer cell) is a block that transfers data from one clock domain to another. If the input of a particular synchronizer cell is tied to a constant, the output of the synchronizer cell is expected to be held at the same constant value. But if the Reset value of the synchronizer cell is different from the constant value the input is tied to, the output of the synchronizer will toggle during Reset removal cycle. Due to this, the formal tool requires more memory to hold this Reset behavior. This step is intended to reduce the burden on the formal tool, and in one embodiment is implemented using VC Formal FCA by way of the following steps: 120A: Compile the design without the test bench using certain VCS compile time switches related to constant analysis: ● -cm_noconst, cm_seqnoconst: These switches trigger constant analysis in VCS during compilation. The uncoverable or constant targets detected in this way are marked as "unreachable" in the URG Reports; ● -diag noconst: This switch is used to create a constant file called "constfile.txt" which contains all the signals in the design VCS detects as constants. 120B: Use a custom script to identify the synchronizer instances in the constant file and record the value to which the input of that synchronizer instance is tied to. The script creates the constraints on outputs of those synchronizer instances by using the corresponding values recorded. 120D: There is a feature in VC Formal called "snip_driver", which can be applied on the signals obtained here, along with the constraint. This allows the tool to ignore the drivers of the signal and assume the value applied in the constraint. This will reduce the burden on the tool since, the cycle level behavior of the signals need not be stored in the formal memory.

Block 130: Update the UNR constraint file with the constant constraints obtained from step 120.

Block 140: Run VC Formal FCA for toggle coverage only and using the updated constraints generated in step 120. Note that this partial (first) UNR process differs from the UNR process performed in step 90A in that the UNR process performed in step 90A involves all coverage properties (i.e., line coverage properties, conditional coverage properties, state/FSM coverage properties, and toggle coverage properties). Line coverage gives an indication of how many statements (lines) are covered in the simulation, by excluding lines like module, end module, comments, timescale, etc. Conditional coverage gives an indication how well variables and expressions (with logical operators) in conditional statements are evaluated. State/FSM coverage reports whether the simulation run could reach all of the states and cover all possible transitions or arcs in a given state machine. This is a complex coverage type as it works on behaviour of the design, that means it interprets the synthesis semantics of the design and monitors the coverage of the FSM representation of control logic blocks. In contrast, toggle coverage provides a report that how many times signals and ports are toggled during a simulation run. It also measures activity in the design, such as unused signals or signals that remain constant or less value changes. Limiting the operation of the unreachable analysis tool (e.g., VC Formal FCA) to toggle coverage only during step 140 greatly reduces the number of processor operations required to generate a revised Toggle Coverage Report that focuses on constant input constraints.

Block 150: Generate Toggle Coverage Report of all the signals by using the URG tool.

Block 160: Identifying one-time programmable and constant registers using Toggle Coverage and (optionally) Design Compiler Reports: Most of the designs require that some registers be programmed during design initialization and are not to be changed thereafter. These are referred to as one-time programmable registers in this document. There are some registers which are not programmed or used in a particular configuration of the design. The formal tool is unaware of these restrictions on these registers. The following procedure is used in this step to identify those signals and add OTP/C constraints on them: 160A: Read the design using Synopsys Design Compiler and extract all the flops in the design using "all_registers" command. A custom script parses the list of registers and checks whether each of them has toggled in the Toggle Coverage Report generated in step 150. A spread sheet containing the list of untoggled flops is analyzed by the designer and constraints are added on a selected set of signals which are programmed only once during initialization or not used for the selected configuration of the design. 160B: If there are unmanageable number of signals obtained from step 160A, there is a method to filter that list to capture only the signals required. Most of the designs which have control registers use a system bus interface like AHB/APB/AXI/others. The registers are programmed to the desired values by software by writing those values through that register interface. Synopsys' Spyglass and VC Formal tools have certain feature which detects the fan in connections of a particular signal. A custom script parses each signal in the list obtained in step 160A to see if the signal is connected to the programming interface. This significantly reduces the number of signals that has to be analyzed by the designer. 160C: If the user is not aware of the signal level functionality of the design, the constraints can be written at the programming interface itself. For this purpose, a methodology is described which automatically maps the addresses corresponding to the registers to internal signals in the RTL. This is achieved using VC Formal's Formal Proof Verification (FPV) application, by writing automatically generated assertions on the programming interface signals. Assertions are written on all combinations of each signal in the list obtained in 160A or 160B and the addresses supported by the register space of the design. The user can use these addresses to constrain the programming interface such that this address corresponds to a one-time programmable or constant register field. 160D: The mapping produced by step 160C can be used in an alternate way too. Without using the spread sheets generated in steps 160B or 160C, the user can select the register fields from the design register document and can write the properties on internal signals, with the help of this mapping.

Block 170: Capturing Initialization registers behavior as constraints: Most of the designs are such that there is some kind of initialization programming involved before the actual functionality starts. This means some registers should programmed only during initialization and they will not change later in the run. There is a simple method presented in this flow to provide this kind of information to the tool. The list of FSMs present in the design are extracted from FSM Coverage Report in the form of a spread sheet. The user has to record the idle states of each of the FSMs which can be used to detect whether the design is still in the initialization phase. From the list of flops obtained from step 160, some of the flops are marked to be programmed only during initialization. Assertions are written on those signals coupling them with each of the FSMs obtained here, such that the signals can change only if the particular FSMs are in their idle state and they should stay in the idle for a certain number of cycles. This is a simple way of modelling the initialization behavior of the registers.

Block 80A: Update the UNR constraint file by collecting the constraints or properties derived from all the previous steps. Note that in this case the UNR constraint file differs from UNR constraint file 80 (FIG. 1) in that it now includes the constant constraints generated by execution of steps 110 to 170.

Blocks 90A and 95A: The iterative process of running the "full" FCA UNR process, analyzing the uncovered items, and adding any constraints if required is then performed using the updated UNR constraint file. With the proposed flow shown in FIG. 2B, a lower number of iterations are required to come to a point where there are no more unreachable items present. Back Annotation of constraints into Coverage Reports: VC Formal has a feature called "Reduced Constraint Analysis" which is used to track which constraint was used to exclude a particular coverage target. A custom script is used to extract all the constraints responsible for each of the unreachable items and they are exported to the exclusion file generated by VC Formal, in the annotation field of each item in the exclusion file. With the help of this, the user can see which constraints have contributed to the unreachability of a particular coverage target in the URG Report.

Validation of properties during simulation: This flow recommends that the constraints be written in terms of System Verilog Assertion (SVA) properties which can be used as \"assume\" properties while running VC Formal and can be validated as \"assert\" properties when running simulation. When given as assert property, there will be a warning or Error reported if the behavior in the constraint is contradicting the behavior in the simulation. This helps in validating the constraints written for formal verification by running functional simulations. Easy maintenance and Reuse: The key benefit of this flow lies in maintaining the constraints or properties for reuse across different configurations of the design or when the design is instantiated in any system. The properties can be exported as coverage assertion IPs across different systems as we envision it. Using all or most of the steps mentioned, a onetime effort is required to create a proper formal verification environment, which can not only be used for coverage analysis, but also general design validation.

Additional Enabling Disclosure
Detailed Description—Technology Specific EDA System/Workflow Explanation FIG. 4 illustrates various processes performed in the design and fabrication of an integrated circuit using software tools with a computer to transform data and instructions that represent the integrated circuit. These processes start with the generation of a product idea (110) with information supplied by a designer and is realized during a design process that uses EDA software tools (112), which may also be signified herein as EDA software, as a design tool or a verification tool. When the design is finalized, it can be taped-out (134). After tape-out, a semiconductor die is fabricated (136) and packaging and assembly processes (138) are performed, which result in the finished integrated circuit (140) which may also be signified herein as a circuit, device, component, chip or SoC (System on Chip). Note that the design process that uses EDA software tools (112) includes operations 114-132, which are described below. This design flow description is for illustration purposes only and is not meant to limit the present disclosure. For example, an actual integrated circuit design may require a designer to perform the design operations in a different sequence than the sequence described herein. During system design (114), a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Then, during logic design and functional verification (116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. Furthermore, during design planning (122), an overall floor plan for the integrated circuit is constructed and analyzed for timing and top-level routing. Exemplary EDA software products from Synopsys, Inc. of Mountain View, Calif. that can be used at this stage include: Astro and IC Compiler products. Additionally, during physical implementation (124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (130), geometric manipulations of the layout are performed to improve manufacturability of the design. Exemplary EDA software products from Synopsys, Inc. of Mountain View, Calif. that can be used at this stage include: Proteus, Proteus, and PSMGED products. Additionally, during mask-data preparation (132), the 'tape-out' data for production of masks to produce finished integrated circuits is provided. Exemplary EDA software products from Synopsys, Inc. of Mountain View, Calif. that can be used at this stage include the Cats. family of products.

For all of the above-mentioned integrated circuit design tools, similar tools from other EDA vendors, such as Cadence and Mentor Graphics can be used as an alternative. Additionally, similarly non-commercial tools available from universities can be used. Embodiments of the present disclosure can be used during one or more of the above-described stages. Specifically, some embodiments of the present disclosure can be used in EDA software 112.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device, that typically is limited in size and/or complexity. For example, one or more methods or procedures in a computer program can be referred to as a module.

A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Altera), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms.

As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

General Computer Explanation

FIGS. 3A, 3B and 3C are simplified block diagrams of a computer system suitable for use with embodiments of the technology, as well as circuit design and circuit embodiments of the technology.

Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that execute them. For example, the innovations, embodiments and/or examples of the claimed inventions can include an optical computer, quantum computer, analog computer, or the like. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3-10 depicted in FIG. 3A is intended only as a specific example for purposes of illustrating the preferred embodiments. Many other configurations of computer system 3110 are possible having more or less components than the computer system depicted in FIG. 3A.

Network interface subsystem 3116 provides an interface to outside networks, including an interface to communication network 3118, and is coupled via communication network 3118 to corresponding interface devices in other computer systems or machines. Communication network 1318 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

FIG. 3B shows a memory 3140 such as a non-transitory, computer readable data storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 3C is a block representing an integrated circuit 3190 created with the described technology that includes one or more cells selected from a cell library.

Definitions

Some embodiments may be described using the expression 'coupled' and 'connected' along with their derivatives. For example, some embodiments may be described using the term 'coupled' to indicate that two or more elements are in direct physical or electrical contact. The term 'coupled', however, may also mean that two or more elements are not in direct contact with each other, but yet still co-operate or interact with each other. The embodiments are not limited in this context.

Covered Equivalents

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described, for example, as a substitute for another feature, structure, or characteristic.

In view of the foregoing Detailed Description it will be evident to a person skilled in the art that many variations may be made within the scope of innovations, embodiments and/or examples, such as function and arrangement of elements, described herein without departing from the principles described herein. The embodiments described herein were chosen and described to signify the principles of the invention and its useful application, thereby enabling others skilled in the art to understand how various embodiments and variations are suited to the particular uses signified. The foregoing Detailed Description of innovations, embodiments, and/or example of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

We claim:

1. A computer-implemented method for identifying dead code in a circuit design during development of the circuit design, the method comprising:

utilizing data contained in a toggle coverage report to automatically generate constant constraints associated with viable constant signals utilized in the circuit design, and performing an unreachability analysis process using the automatically generated constant constraints to distinguish the dead code from the viable constant signals, wherein utilizing the data contained in the coverage report comprises:

identifying constant inputs from the toggle coverage report, utilizing the identified constant inputs to generate corresponding constant input constraints;

performing a first unreachability analysis process only for toggle coverage properties using the constant input constraints;

generating a revised toggle coverage report in accordance with the first unreachability analysis process; and performing a second unreachability analysis process for line coverage, conditional coverage, state coverage and toggle coverage properties using the revised toggle coverage report.

2. The method of claim 1, further comprising forward propagating the identified constant inputs through synchronizers to all domains of the circuit design and generating corresponding constant input constraints before performing said first unreachability analysis process.

3. The method of claim 1,
wherein utilizing the data contained in the coverage report further comprises identifying one-time programmable and constant (OTP/C) registers, and generating corresponding OTP/C constraints, and wherein performing the second unreachability analysis process further comprises utilizing the OTP/C constraints.

4. The method of claim 1,
wherein utilizing the data contained in the coverage report comprises identifying one-time programmable and constant (OTP/C) registers, and generating corresponding OTP/C constraints, and wherein performing the unreachability analysis process comprises analyzing said circuit design for line coverage, conditional coverage, state coverage and toggle coverage properties using the OTP/C constraints.

5. A non-transitory computer readable medium comprising a stored circuit design and stored instructions, the instructions, when executed by a processor, cause the processor to execute operations for identifying dead code in the circuit design, the operations including:

utilizing data contained in a toggle coverage report to automatically generate constant constraints associated with viable constant signals utilized in the circuit design, and performing an unreachability analysis process using the automatically generated constant constraints to distinguish the dead code from the viable constant signals, wherein utilizing the data contained in the coverage report comprises:

identifying constant inputs from the toggle coverage report, utilizing the identified constant inputs to generate corresponding constant input constraints;

performing a first unreachability analysis process only for toggle coverage properties using the constant input constraints;

generating a revised toggle coverage report in accordance with the first unreachability analysis process; and performing a second unreachability analysis process for line coverage, conditional coverage, state coverage and toggle coverage properties using the revised toggle coverage report.

6. The non-transitory computer readable medium of claim 5, further comprising forward propagating the identified constant inputs through synchronizers to all domains of the circuit design and generating corresponding constant input constraints before performing said first unreachability analysis process.

7. The non-transitory computer readable medium of claim 5,
wherein utilizing the data contained in the coverage report further comprises identifying one-time programmable and constant (OTP/C) registers, and generating corresponding OTP/C constraints, and wherein performing the second unreachability analysis process further comprises utilizing the OTP/C constraints.

8. The non-transitory computer readable medium of claim 5,
wherein utilizing the data contained in the coverage report comprises identifying one-time programmable and constant (OTP/C) registers, and generating corresponding OTP/C constraints, and wherein performing the unreachability analysis process comprises analyzing said circuit design for line coverage, conditional coverage, state coverage and toggle coverage properties using the OTP/C constraints.

9. A system comprising:
a memory storing instructions; and
a processor, coupled with the memory and configured to execute the instructions, the instructions when executed cause the processor to execute operations comprising:

utilizing data contained in a toggle coverage report to automatically generate constant constraints associated with viable constant signals utilized in the circuit design, and performing an unreachability analysis process using the automatically generated constant constraints to distinguish dead code in the circuit design from the viable constant signals in the circuit design, wherein utilizing the data contained in the coverage report comprises:

identifying constant inputs from the toggle coverage report, utilizing the identified constant inputs to generate corresponding constant input constraints;

performing a first unreachability analysis process only for toggle coverage properties using the constant input constraints;

generating a revised toggle coverage report in accordance with the first unreachability analysis process; and performing a second unreachability analysis process for line coverage, conditional coverage, state coverage and toggle coverage properties using the revised toggle coverage report.

10. The system of claim 9, further comprising forward propagating the identified constant inputs through synchronizers to all domains of the circuit design and generating corresponding constant input constraints before performing said first unreachability analysis process.

11. The system of claim 9,
wherein utilizing the data contained in the coverage report further comprises identifying one-time programmable and constant (OTP/C) registers, and generating corresponding OTP/C constraints, and wherein performing the second unreachability analysis process further comprises utilizing the OTP/C constraints.

12. The system of claim 9, wherein utilizing the data contained in the coverage report comprises identifying one-time programmable and constant (OTP/C) registers, and generating corresponding OTP/C constraints, and wherein performing the unreachability analysis process comprises analyzing said circuit design for line coverage, conditional coverage, state coverage and toggle coverage properties using the OTP/C constraints.

* * * * *